(No Model.)
G. FOWLER.
HEEL.
No. 530,760. Patented Dec. 11, 1894.
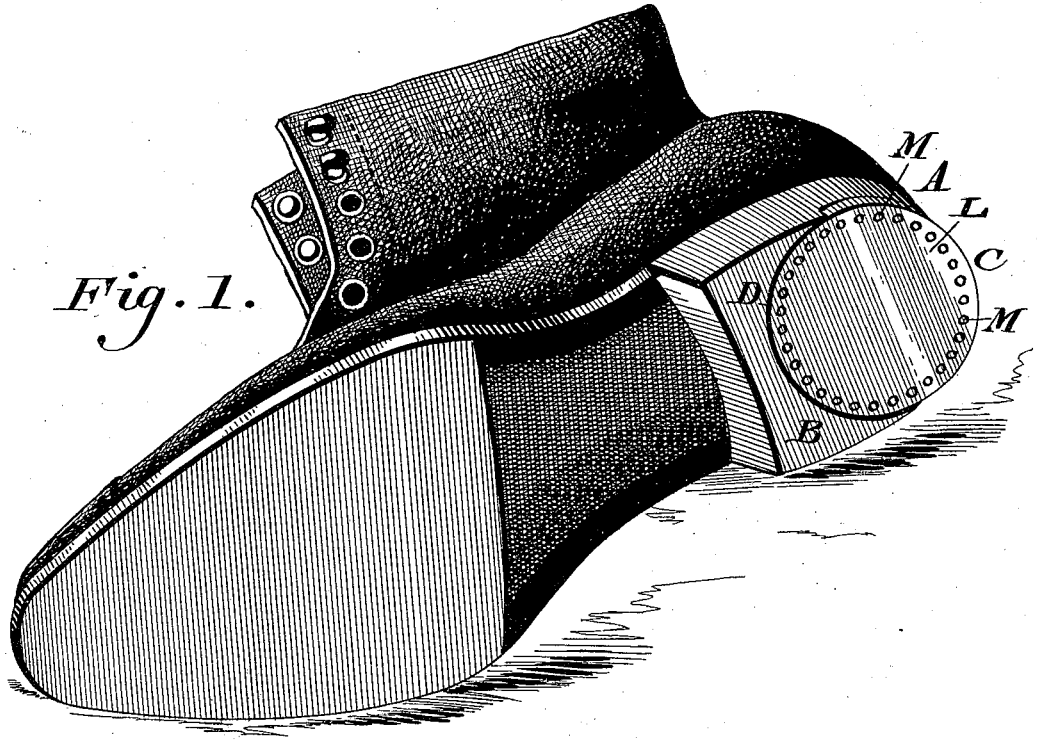
Fig. 1.
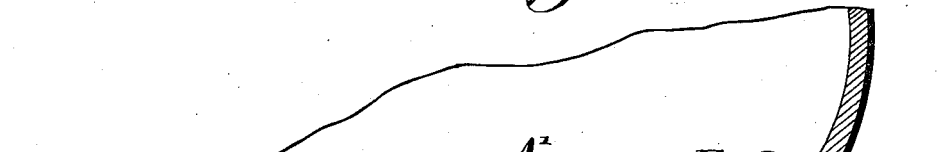
Fig. 2.
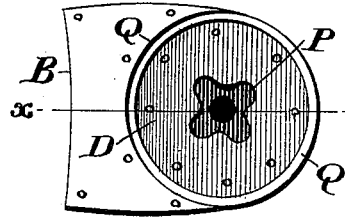
Fig. 4.
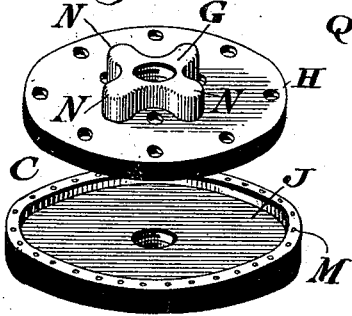
Fig. 3.
Fig. 5.
WITNESSES:
P. H. Aagke.
L. Douville.
INVENTOR
George Fowler
BY Joshua Wiesenberg
ATTORNEY.
THE NORRIS PETERS CO., PHOTO-LITHO., WASHINGTON, D. C.

UNITED STATES PATENT OFFICE.

GEORGE FOWLER, OF PHILADELPHIA, PENNSYLVANIA, ASSIGNOR OF ONE-HALF TO JAMES W. MATHERS, OF SAME PLACE.

HEEL.

SPECIFICATION forming part of Letters Patent No. 530,760, dated December 11, 1894.

Application filed February 26, 1894. Serial No. 501,482. (No model.)

*To all whom it may concern:*

Be it known that I, GEORGE FOWLER, a subject of the Queen of Great Britain, residing in the city and county of Philadelphia, State of Pennsylvania, have invented a new and useful Improvement in Boot or Shoe Heels, which improvement is fully set forth in the following specification and accompanying drawings.

My invention consists of a heel for a boot or shoe formed of stationary and rotatable parts, means for connecting said parts, and strengthening, steadying and supporting the same, and preventing improper rotation of the rotatable part, as will be hereinafter fully set forth.

Figure 1 represents a perspective view of a heel embodying my invention. Fig. 2 represents a vertical section thereof. Fig. 3 represents a perspective view of detached portions, separated. Fig. 4 represents a bottom view of a detached portion on a reduced scale. Fig. 5 represents a section on line $x$, $x$, Fig. 4.

Similar letters of reference indicate corresponding parts in the several figures.

Referring to the drawings: A designates a heel formed of the parts B and C, the part B being firmly secured to the sole of the shoe as a fixture or stationary member, and having a semi-circular recess D, which is occupied by portion of the part C, which latter is rotatable and connected with the sole A' by means of a screw E, which is passed through a nut G, the latter being formed with or attached to the plate H, with which the lift J is connected by means of rivets K, or other suitable fastening.

L designates the top lift, which is secured to the rim of the lift J by means of nails, tacks, &c., as at M, the same being clinched or riveted in position, it being seen that the lifts L, J, the plate H, and nut G are connected as one, and that the head of the screw G is seated on the sole A', by which provision the part C is surely retained in position, as a continuity of the part B, thus producing a firm and broad tread.

In order to prevent rotation of the part C, the nut G is formed with wings N, which enter a winged recess P in the part B, thus locking the nut with said part B, whereby said nut and members attached thereto are controlled in their rotation.

The wall of the recess D has the shoulder Q around the same, forming a circumferential flange which freely incloses the rim of the plate H, and serves to steady and support said plate and consequently the part C on the part B.

When the part C wears out or is run down, the screw E is loosened and said part removed or drawn out sufficiently whereby the nut G emerges from the recess P. The part is then rotated and reapplied, the wings restored to the recess and the screw tightened, thus again clamping the part in position and preventing rotation thereof.

When the lift L is worn out, as the heads of the nails M may wear out, said lift may be readily disconnected from the lift J, and a fresh lift applied and secured in place of said lift L, it being evident that the rivets K or fastenings of the lift J and plate H are independent of those of the two lifts J and L.

Having thus described my invention, what I claim as new, and desire to secure by Letters Patent, is—

1. A boot heel consisting of the stationary part B, having a semi-circular recess in its rear portion, the rotatable part C having a portion occupying said recess, the plate H with the nut G secured thereto, the screw E connecting said plate and the sole of the boot, the lift J covering said plate and the lift L secured to said lift J, said parts being combined substantially as described.

2. A boot heel consisting of the stationary part B, having a semi-circular recess in its rear portion, the rotatable part C having a portion occupying said recess, the plate H having the nut G with the wings N, the screw E connecting said plate and the sole of the boot, the lift J secured to said plate, and the lift L secured to the rim of the lift J, said part B having the flanged shoulder Q inclosing the rim of the plate H, said parts being combined substantially as described.

3. A heel formed of stationary and rotary parts, a lift-carrying plate with a nut on the rotary part, a connecting screw passing through the sole and stationary part into the nut, a winged nut for preventing rotation of the rotary part, and a flange for the stationary part freely encircling said plate of the rotary part, the combination being substantially as described.

4. In a heel, a stationary part having a recess, a rotatable part having a portion occupying said recess, a plate with a nut thereon, a connecting screw for said plate, the lift J which is secured to said plate by the devices K, the lift L which is secured to the lift J by the devices M, said devices K and M being independent of each other, substantially as described.

GEORGE FOWLER.

Witnesses:
JOHN A. WIEDERSHEIM,
A. P. JENNINGS.